Sept. 25, 1956 N. KENJOSKI 2,763,976
HUSKING ATTACHMENT FOR TRACTOR MOUNTED CORN HARVESTERS
Filed Oct. 27, 1953 11 Sheets-Sheet 1

INVENTOR.
NICHOLAS KENJOSKI.
BY Alden D. Redfield
Warren Kunz.
ATTORNEYS.

Sept. 25, 1956 N. KENJOSKI 2,763,976
HUSKING ATTACHMENT FOR TRACTOR MOUNTED CORN HARVESTERS
Filed Oct. 27, 1953 11 Sheets-Sheet 3

INVENTOR.
NICHOLAS KENJOSKI.
BY
ATTORNEYS.

INVENTOR.
NICHOLAS KENJOSKI.
BY Alden D. Redfield
Warren Kinz.
ATTORNEYS.

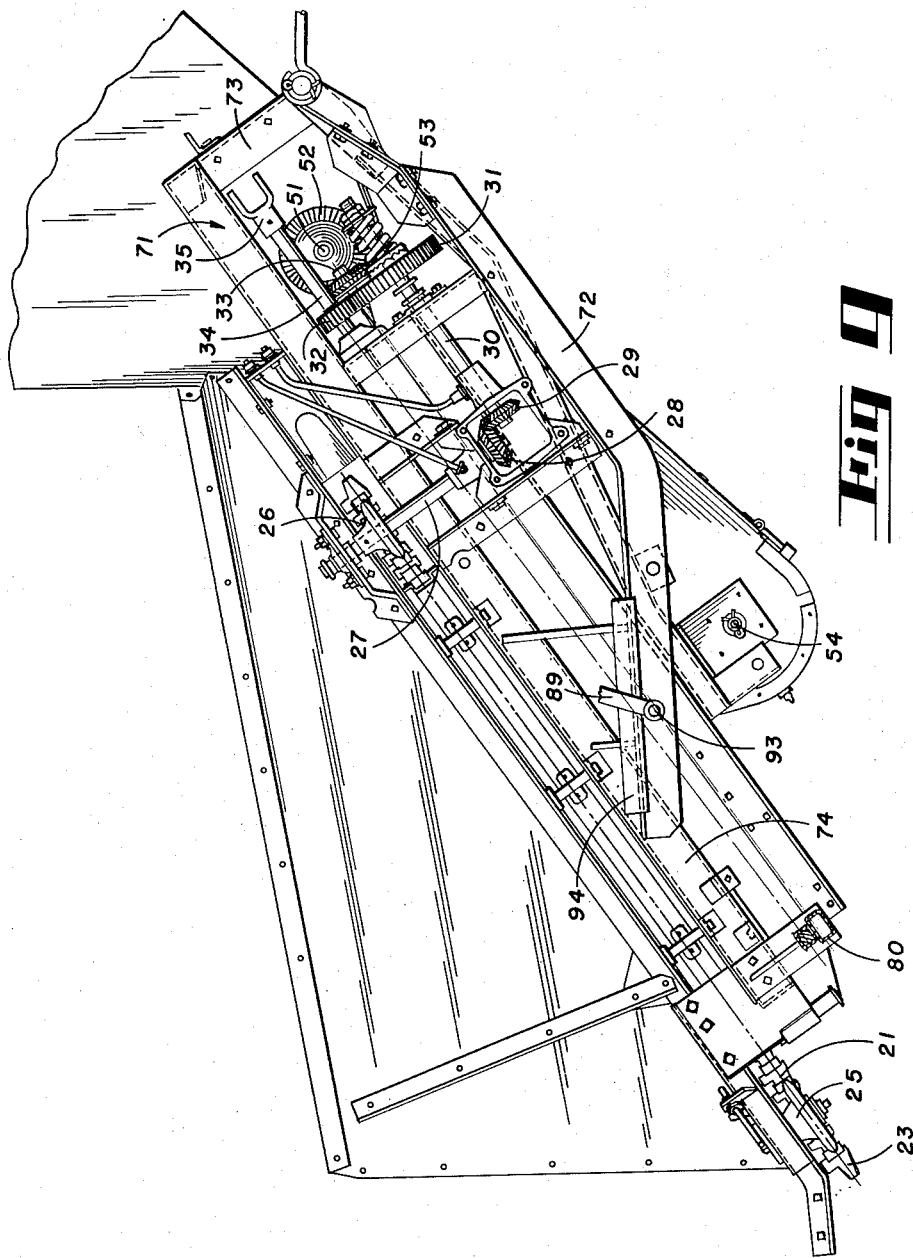

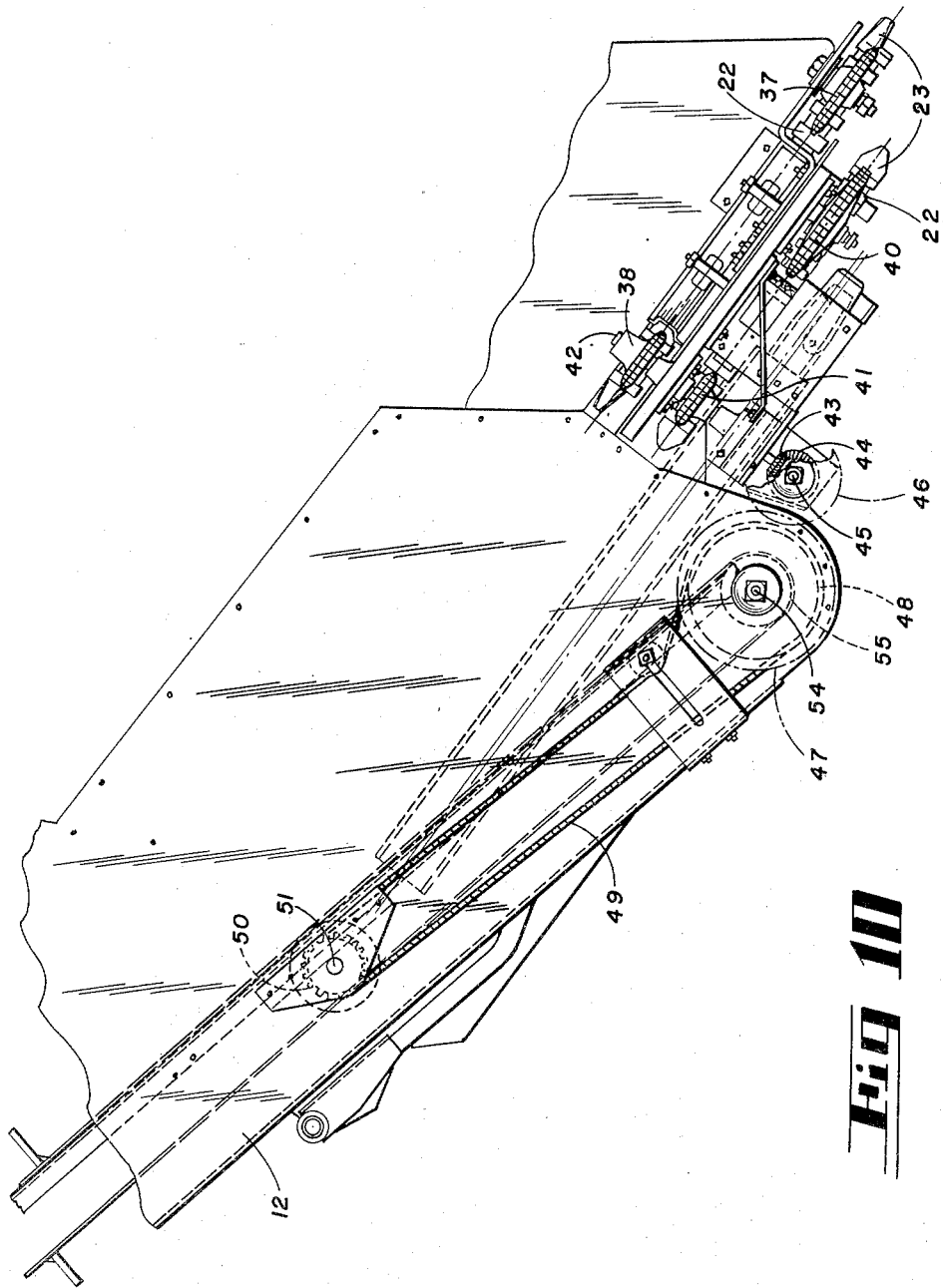

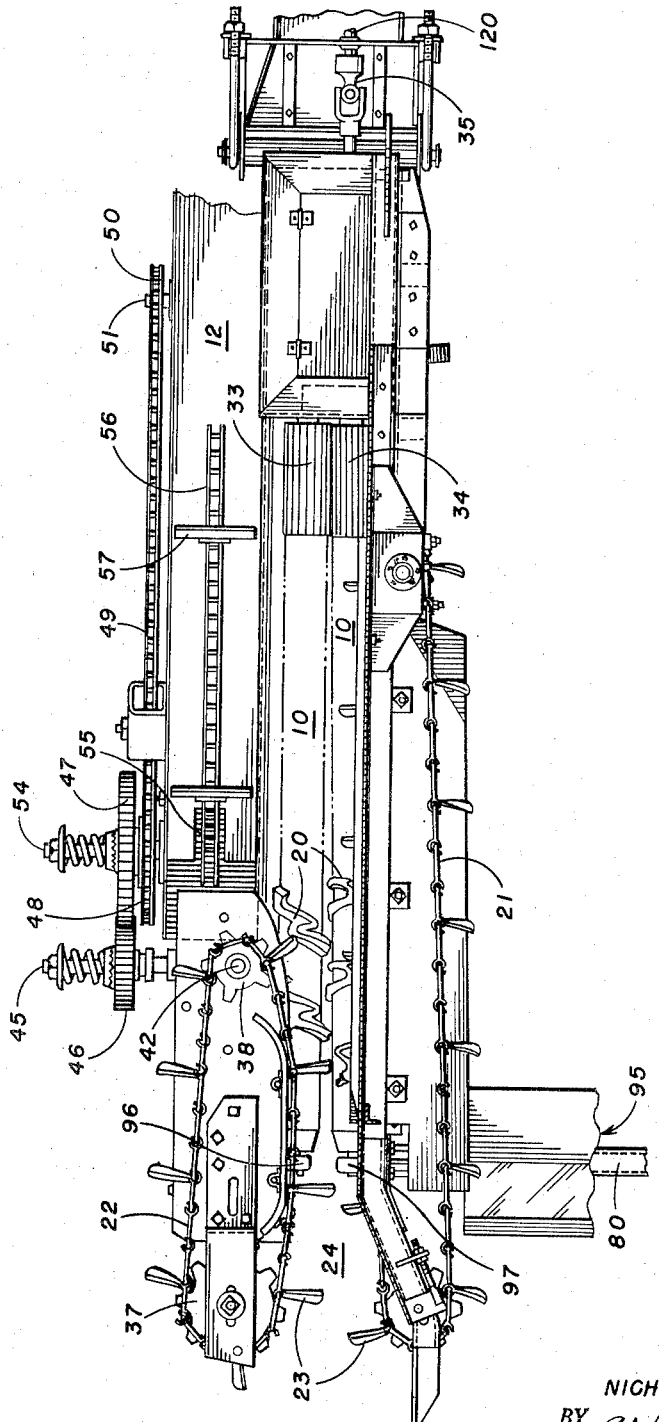

Sept. 25, 1956  N. KENJOSKI  2,763,976
HUSKING ATTACHMENT FOR TRACTOR MOUNTED CORN HARVESTERS
Filed Oct. 27, 1953  11 Sheets-Sheet 11

INVENTOR.
NICHOLAS KENJOSKI.
BY Alden D. Redfield
Warren Kunz.
ATTORNEYS.

United States Patent Office 2,763,976
Patented Sept. 25, 1956

2,763,976

HUSKING ATTACHMENT FOR TRACTOR MOUNTED CORN HARVESTERS

Nicholas Kenjoski, Celina, Ohio, assignor to Avco Manufacturing Corporation, Cincinnati, Ohio, a corporation of Delaware Application October 27, 1953, Serial No. 388,469

11 Claims. (Cl. 56—18)

The present invention relates to corn harvesting equipment and more particularly to a combination corn snapping and husking unit for attachment to a farm tractor. More particularly the invention relates to a tractor mounted harvester in which the ear snapping units are attached at the sides of the tractor with a semi-mounted husking unit positioned behind the tractor and snapping units, the entire harvester being powered from the power take-off of the tractor.

Most of the components which are assembled in the novel combination of this invention are old per se. Not only are these components structurally well-known in the art, but the functions performed may be regarded as conventional.

The novelty of the present invention resides primarily in the over-all combination of elements which makes possible their more effective cooperation and simplification of arrangement. Further, through the novel combination of elements, attachment of the harvester to the tractor has been simplified and utility of the tractor for purposes other than harvesting has been facilitated.

The present invention particularly concerns a corn harvester comprising a novel trailing type husking unit which is semi-mounted on the tractor. Broadly considered, trailing type husking units are not new, one form being shown in the Metcalf Patent 1,945,119 which issued in 1934; however, the construction of the husking unit of the present invention and its attachment to the tractor differ from Metcalf in important respects which will be understood more fully after consideration of the following description.

Briefly described, the present invention comprises a pair of snapping units, each of which is adjustably attached to the rear axle housing of a tractor. Each snapping unit includes a plurality of gathering chains at its forward end which cooperate in feeding the corn stalks to a pair of associated snapping rolls. From the snapping rolls, the ears, which have been removed from the stalks, are delivered to a longitudinally and upwardly extending endless conveyor which delivers the ears to a central receiver located at the front of a husking unit.

The husking unit is semi-mounted behind the tractor and may include a bed with ten or more husking rolls which remove the husks from the ears. After being husked, the ears leave the rear of the husking bed and pass to a hopper from which the ears are conveyed by a rearwardly extending elevator to a vehicle behind the harvester.

A cardinal feature of the invention is the disposition of the husking unit behind the tractor. A pair of caster wheels is provided at the rear of the husking unit, the forward end of the unit being supported by a tractor-mounted bracket which constrains it to follow directly behind the tractor while permitting limited rotational movements about its longitudinal axis, thus avoiding severe stresses in its structural framework as rough terrain is traversed.

Passage of ears from the snapping to the husking units is greatly facilitated by the relatively fixed position of the husking unit. Further, removal of the unit from the tractor, thereby rendering the tractor available for other farming activities, is also facilitated by the semi-mounted arrangement. Transfer of power from tractor to husking unit is also simplified. Other advantages will become obvious from the specification.

In view of the foregoing, it will be appreciated that a broad object of the present invention is to provide an improved corn harvester.

More specifically, it is an object of the present invention to provide a corn harvester which can be readily attached to a tractor. An advantage of the invention is that the husking unit can be easily and quickly detached from the tractor without removal of the snapping units which, although attached to the tractor, do not interfere with its use in other farming activities.

It is also an object of the invention to provide a semi-mounted husking unit having caster wheels for bearing part of the husking bed weight, thereby relieving the tractor from excessive loading.

Through this invention the following additional objectives are attained:

(a) Installation of a husking unit at the rear of a tractor in a manner constraining it to follow directly behind the tractor without the imposition of severe stresses on the husking unit or use of heavy frame members.

(b) Trailing disposition of a husking unit behind the tractor facilitating delivery of ears to the unit.

(c) Ease of attachment of a pair of snapping units and a husking unit to a variety of different farm tractors.

(d) Improved husking efficiency resulting from the provision of a large number of husking rolls.

(e) Improved husking efficiency in a tractor mounted harvester resulting from the downward inclination of the husking rolls.

(f) Improved husking efficiency resulting from uniform distribution of ears over the bed of the husking unit.

The novel features that are considered characteristic of the invention are set forth in the appended claims; the invention itself, however, both as to its organization and method of operation together with additional objects and advantages thereof will best be understood from the following description of the preferred embodiment when read in conjunction with the accompanying drawings, in which:

Figure 8:
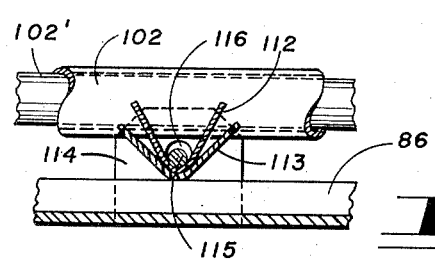
Figure 17:
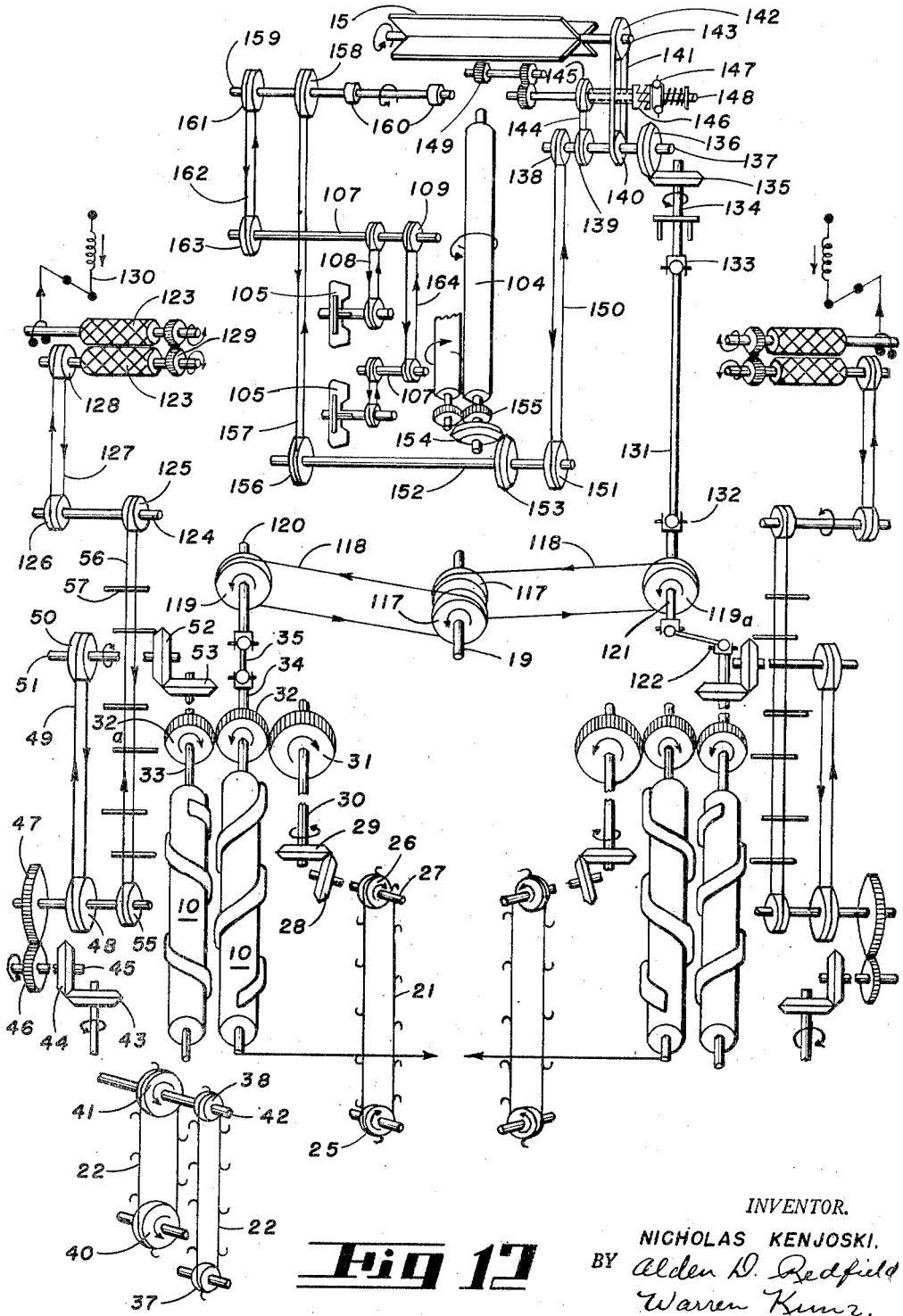

Fig. 8 is a fragmentary view of a portion of the husking unit mounting bracket taken at the point where the husking unit is pivotally secured thereto;

Fig. 9 is a side elevational view of the lower portion of a snapping unit, the view being taken from the interior tractor-side and showing laterally extending parts in cross section;

Fig. 10 is a side elevational view of the lower portion of a snapping unit taken from the exterior side, parts being broken away to simplify the illustration;

Fig. 11 is a top plan view of the lower portion of a snapping unit; and

Fig. 12 is a schematic representation of the various driving and driven elements of the harvester which are powered by the tractor.

Over-all assembly

Figure 1:
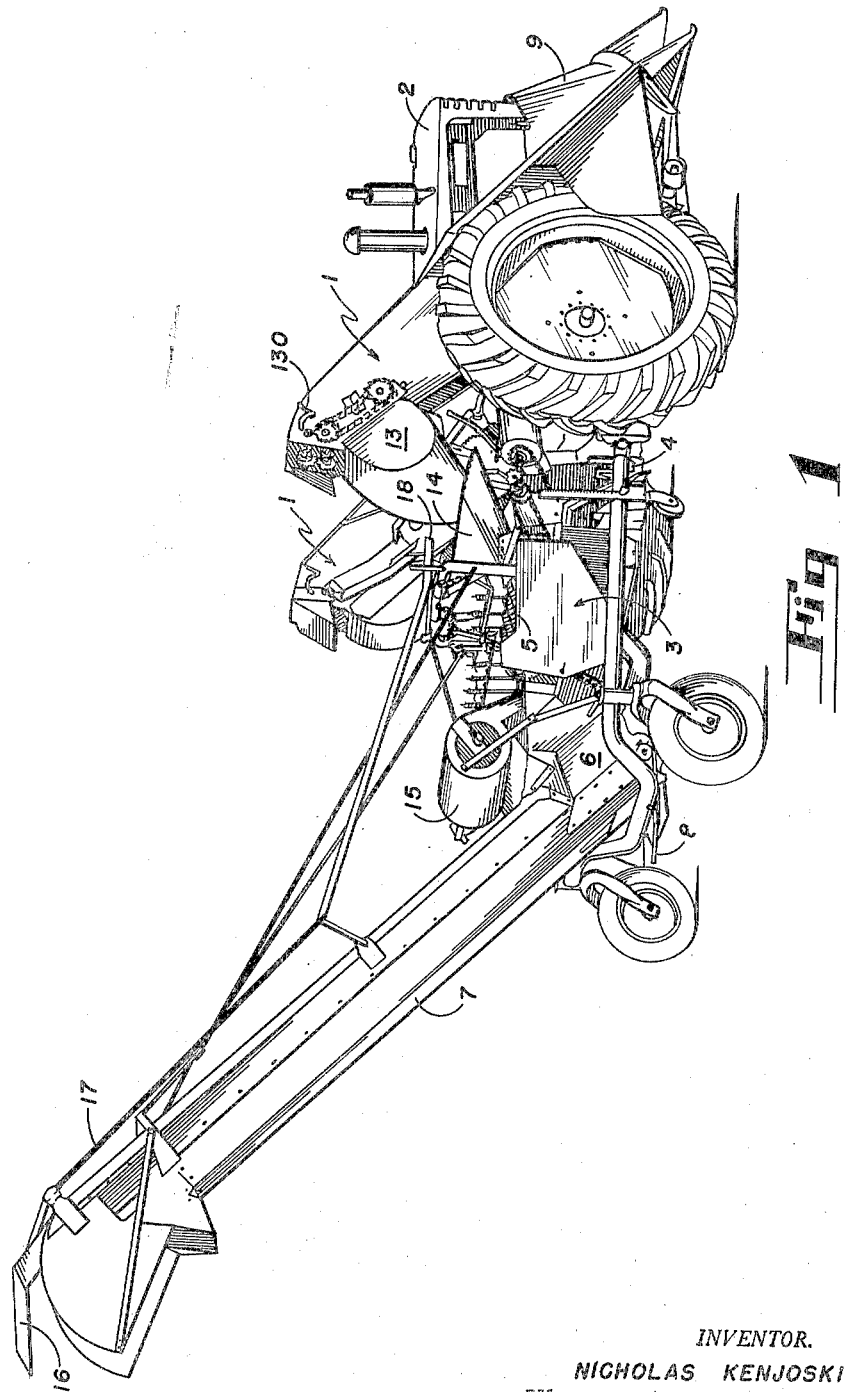
Fig. 1 is a perspective view of the harvester completely assembled on a tractor, the view being taken from the side rear of the harvester.
Figure 2:
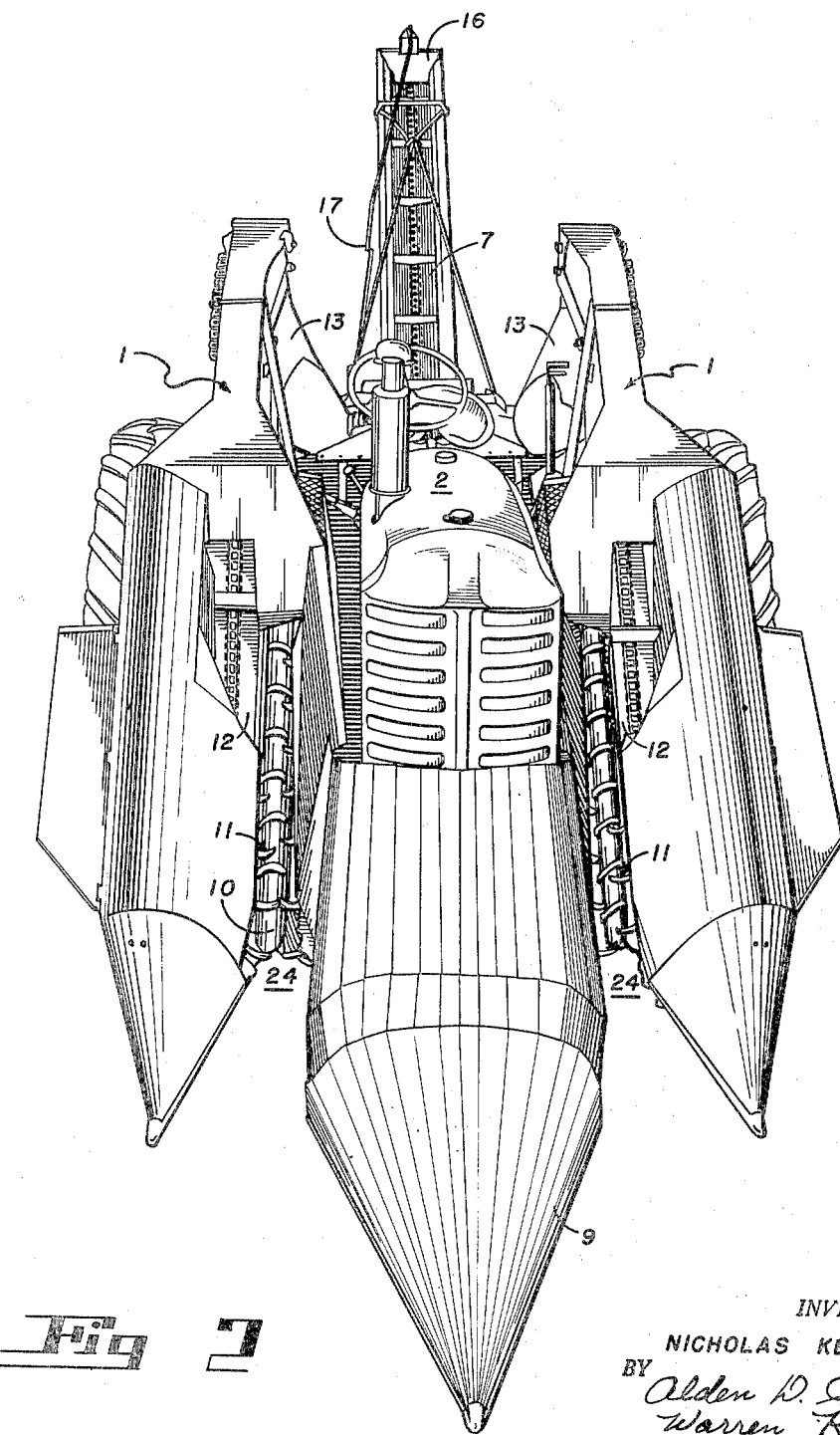
Fig. 2 is a perspective view taken from an elevated point in front of the harvester.

As particularly well illustrated in Figs. 1 and 2, the present harvester comprises a pair of snapping units, generally designated 1, supported in longitudinally extending relation at the sides of a tractor 2. A husking unit, generally designated 3, is removably attached to the rear of the tractor at 4.

For harvesting purposes, the tractor is driven along the rows of a corn field, the snapping units 1 engaging simultaneously two rows of corn stalks. In a manner which will be more fully described hereinafter, the snapping units remove the ears from the stalks and convey them to bed 5 of the husking unit. The husking bed is downwardly inclined and the ears pass during the husking operation to the rear of the unit where they accumulate in a hopper 6 from which elevator 7 picks up the ears. The elevator conveys the ears to a trailing vehicle (not shown) which may be attached to a drawbar 8 behind the harvester.

As illustrated in Fig. 2, a sheet metal divider 9 is provided at the front of the tractor in position to travel between the rows of corn engaged by the snapping units. The corn stalks are engaged at either side of divider 9 by pairs of snapping rolls 10 which comprise components of the snapping units. As the harvester progresses through the field, the stalks are urged into the snapping rolls by gather chains generally designated 11, which are provided on both sides of the snapping rolls in each snapping unit.

As the ears are removed from the stalks, they pass to an elevator 12 in each of the snapping units. These elevators (known as the "first" elevators) convey the ears upwardly toward the rear of the machine. Sheet metal guides 13 are provided at the upper ends of each first elevator to guide the ears into a receiver 14 provided at the front end of the husking unit. From receiver 14, the ears distribute themselves uniformly over the husking bed, promoting improved husking efficiency.

Attached integrally to the husking unit is a blower 15 which blasts air over the husking bed to blow dirt and other debris away from the ears, in a manner well known in the art. As the cleaned and husked ears are delivered by elevator 7 to the trailing vehicle, an adjustable deflector 16 guides them to various portions of the vehicle, thereby distributing the load equally. Deflector 16 is positioned by means of rod 17 which can be adjusted by the tractor operator, handle 18 being provided for this purpose.

As will be described more completely later in this specification, the entire harvester is driven by power from the power take-off shaft 19 of the tractor (see Fig. 5).

Snapping units

For convenience, the right-hand (as viewed by the tractor operator) snapping unit is illustrated in Figs. 9 through 11. First, with reference to Fig. 11, it will be noted that each snapping unit includes a pair of contiguous snapping rolls 10. The formation of the snapping rolls per se is conventional and they may be made from cast iron with integral bosses 20. In operation the snapping rolls are rotated so that their adjacent surfaces pass downwardly towards the bottom of the snapping unit. Rotation of the rolls and engagement of bosses 20 with the stalks snaps the ears from the stalks, the ears being urged up along the rolls by an inner gathering chain 21.

Inner chain 21 cooperates at its forward end with a pair of outer gathering chains 22. These chains carry pluralities of projecting fingers 23 which engage the stalks as the harvester advances and urge them into throat 24 of the snapping unit.

With particular reference to Fig. 9, it will be noted that the inner chain 21 is substantially as long as the snapping rolls. This chain is trained over a pair of sprockets 25 and 26, sprocket 26 being driven by shaft 27. Shaft 27 is secured to bevel gear 28 which is in meshed engagement with another bevel gear 29 secured to shaft 30. This shaft extends rearwardly and carries spur gear 31 which is in mesh with spur gear 32 secured to inner snapping roll shaft 34. Spur gear 32 is also in meshed engagement with a similar spur gear 32a secured to outer snapping roll shaft 33 (see Fig. 12). A universal joint 35 is secured to the upper end of shaft 34 and receives power from the power take-off shaft of the tractor, as will be described later in this application. All of the power for driving the right snapping unit passes through universal joint 35.

To simplify the illustration, only the center lines of the snapping rolls have been shown in Fig. 9. It will be noted that the inner snapping roll shaft 34 is positioned slightly higher than the outer shaft 33. Thus, the snapping rolls are inclined slightly so that ears, as they are snapped from the stalks, tend to roll toward the outside of the snapping unit.

The driving mechanism for the outer gathering chains 22 is illustrated in Fig. 10. With reference to the figure, it will be noted that the upper chain engages a pair of sprockets 37 and 38. The lower chain engages sprockets 40 and 41.

Sprockets 38 and 41 are secured to shaft 42 which is driven by bevel gear 43 through bevel gear 44. Gear 44 is secured to horizontal shaft 45 which extends to the outside of the snapping unit, as illustrated in Fig. 11. Also secured to this shaft is a spur gear 46 which is meshed with another spur gear 47. Integrally secured to gear 47 is a sprocket 48, driven by chain 49 which is, in turn, driven by sprocket 50. This sprocket is engaged with another horizontal shaft 51 which extends laterally of the snapping unit.

Shaft 51 is driven by a bevel gear 52 (see Fig. 9), this bevel gear being engaged with a smaller bevel gear 53 which is attached to snapping roll shaft 33.

Gear 47 and sprocket 48 are secured to horizontal shaft 54 which passes beneath the upper run of the first elevator 12. A driving sprocket 55 is also attached to shaft 54 and impart movement to chain 56 of the first elevator.

From the foregoing description, it will be appreciated that all elements of the snapping unit are driven through the universal joint 35, and that all of the elements are driven simultaneously. As the harvester progresses through a corn field, the stalks are simultaneously engaged by fingers 23 of the gathering chains and the ears are snapped from the stalks by snapping rolls 10. The long gathering chain 21 carries the ears toward the upper end of the snapping rolls where they roll onto the first elevator 12. Chain 56 of the first elevator carries with its flights 57 which convey the ears toward the rear, directing them into guides 13 from which they pass to the receiver 14 of the husking unit.

Snapping unit mounting

Each snapping unit is pivotally attached to the rear tractor axle housing. This is well illustrated in Fig. 7 which, when considered with Figs. 5 and 6, discloses the details of the mounting installation.

Figure 6:
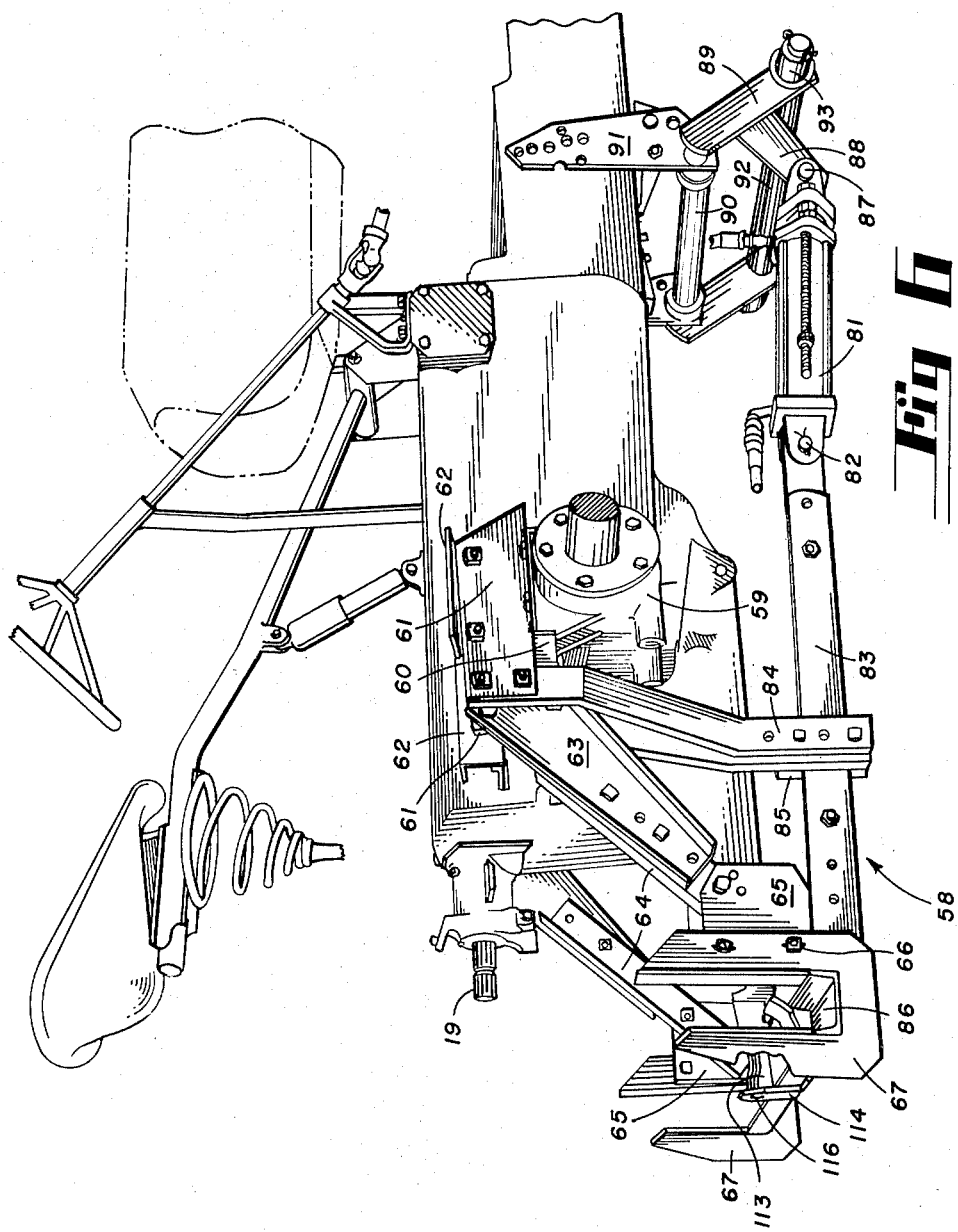
Fig. 6 is a perspective fragmentary view of the tractor and the husking unit mounting bracket, parts being broken away and shown in cross section to simply the illustration. The view also shows the hydraulic mechanism for adjusting the vertical position of the snapping units relative to the ground.

First, with reference to Fig. 6, it will be noted that a bracket, generally designated 58, is attached to both sides of the rear tractor axle housing 59. The means of attachment comprises mounting plates 60 which are securely bolted to housing 59 and welded to vertically disposed plates 61. These plates, in turn, support pairs of angle irons 62 for a purpose to be disclosed later.

The bracket 58 also includes downwardly and rearwardly extending channel members 63 which are bolted to the rear ends of plates 61. These channels 63 are bolted for adjustability to angle irons 64 which are joined to gusset plates 65. The gusset plates are bolted, as at 66, to U-shaped upwardly extending guide members 67 which serve a purpose to be described hereinafter.

Figure 7:
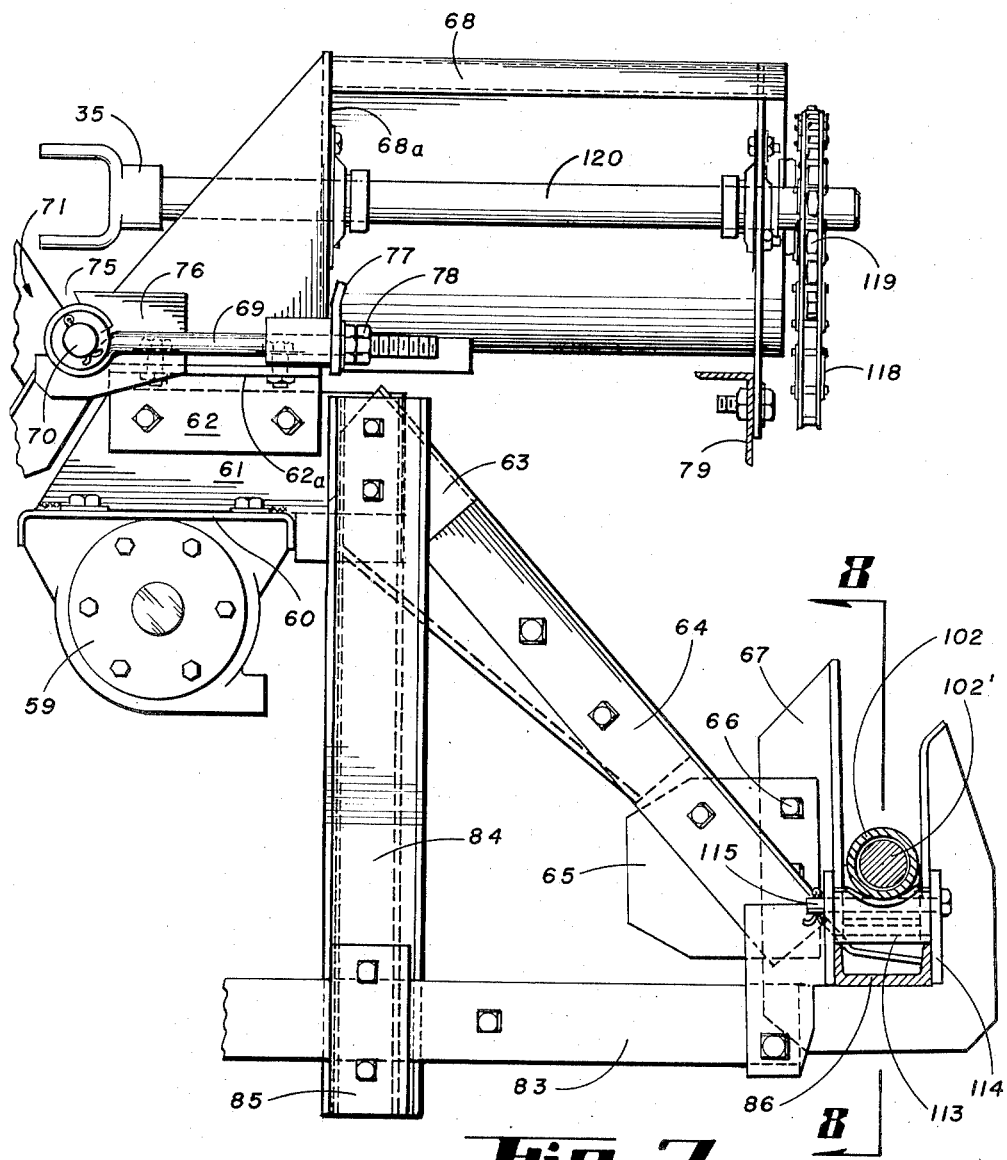
Fig. 7 is a vertical sectional view taken on plane 7—7 of Fig. 5, the view showing the structural details of the snapping unit driving assemblies and the husking unit mounting bracket.

Attention should now be directed to Fig. 7 which shows in elevation the tractor housing 59 with one of the plates 60 directly attached to it in supporting relationship with a pair of plates 61 and angle irons 62. It should be noted that to outstanding legs 62a of the angle irons there is attached a driving assembly 68 by which power is transmitted to an associated snapping unit. A similar driving assembly is provided at each side of the tractor for each snapping unit.

The associated snapping unit is releasably attached to the driving assembly 68 by a pair of eye-bolts 69. These eye-bolts are swingably attached to a transverse pivot pin 70 which passes through the upper extremity of the snapping unit framework 71.

With reference to Fig. 9, it will be noted that framework 71 comprises an angularly shaped angle iron 72 joined to other structural elements 73 and 74 to form a rugged box-like configuration. This framework supports the various bearings and related shafts for the husking rolls and gathering chains, in a manner well known to those skilled in the art.

Returning to Fig. 7, it will be noted that transverse pin 70 is received in notches 75 of support plates 76 which were welded to the sides of driving assemblies 68. The eye-bolts 69 pass through slotted transverse anchor plates 77, nuts 78 being provided on the eye-bolts to attach the snapping unit securely to its mounting above the tractor axle housing. Plates 77 are welded to transverse wall 68a of assemblies 68.

A similar structure is provided on each side of the tractor and it will be understood that the snapping units are adjustable in vertical planes about the axes of pins 70.

Figure 5:
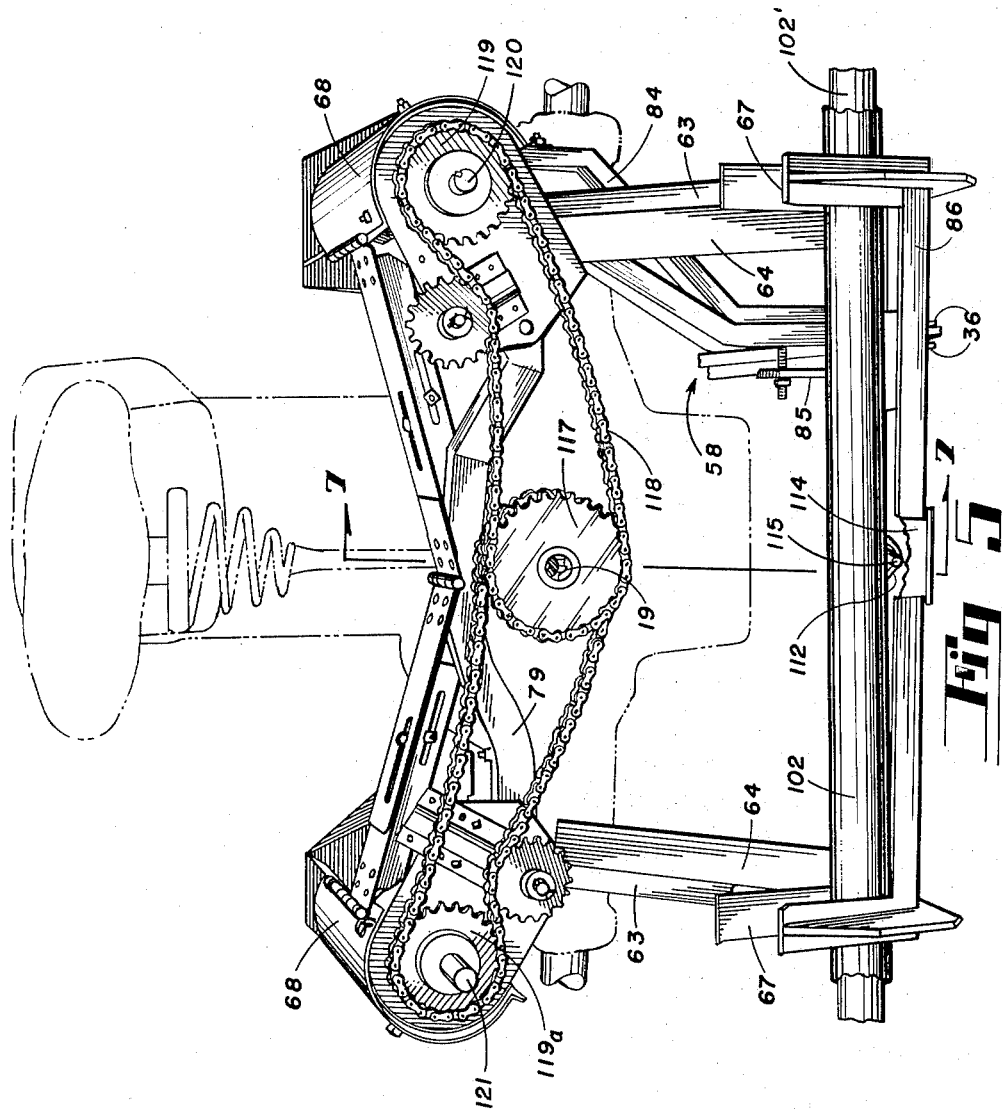
Fig. 5 is a perspective fragmentary view of the rear of the tractor with the snapping unit driving assemblies attached. The view also shows the rearwardly extending bracket attached to the tractor for supporting the front of the husking unit.

As illustrated in Fig. 5, a transverse structural member 79 is secured to and extends between the snapping unit driving assemblies and positions them laterally in predetermined positions relative to the tractor.

As indicated in Fig. 11, another transverse structural member 80 extends between and is secured to the forward ends of the snapping units to assure that the snapping units execute corresponding movements in the course of vertical adjustment.

Snapping unit adjustment

Vertical adjustment of the snapping units can be readily understood by reference to Fig. 6 which illustrates a hydraulic cylinder 81 pivotally secured at 82 to a rearwardly extending rigid structural member 83. This structural member is supported in space by means of depending channels 84 which are clamped to member 83 by plate 85. The rear end of member 83 is rigidly attached to depending plates 36 (see Fig. 5) welded to a transverse channel 86 which extends between and is integrally secured to the guide members 67.

The forward end of cylinder 81 is pivotally secured at 87 to an outstanding arm 88 of a swingable frame 89 rotatably supported by cross member 90 which engages depending rigid side plates 91. These side plates are attached directly to the tractor and support the frame 89 for movement beneath the tractor and adjacent the snapping units.

It will be noted that framework 89 includes a transverse member 92 on the ends of which are provided flanged rollers 93. These rollers are designed to engage angle irons 94 (see Fig. 9) attached directly to framework 71 of the snapping unit.

As framework 89 is swung about member 90 by hydraulic cylinder 81, rollers 93 are correspondingly urged into different positions of engagement with angle irons 94, thereby imparting vertical adjustment to the snapping units.

It will be appreciated that vertical adjustment of the snapping units is highly desirable to accommodate different types of terrain and field conditions that may be encountered. The adjusting mechanism also makes it possible to raise the snapping units to a relatively high inoperative position, facilitating use of the tractor for purposes other than harvesting despite the fact that the snapping units may remain attached to the tractor. More will be said about this later in this specification.

It should be noted, with reference to Fig. 11, that a cam adjusting mechanism 95 is provided between the snapping units to effect adjustment of the relative positions of the inner snapping rolls. It will be noted that the outer snapping roll is provided with a fixed bearing support 96, but that the inner snapping roll is supported at its lower end by an adjustable bearing 97. Since the means for adjusting the snapping rolls does not comprise a part of this invention, it will be sufficient to point out that the cam mechanism can be actuated by a control adjacent the tractor operator's seat whereby later adjustment of the inner snapping rolls of both snapping units can be effected simultaneously. This is a desirable feature since particular field conditions require different spacing between the snapping rolls. Further, it is advantageous to be able to adjust the snapping roll spacing directly from the tractor operator's seat, since it avoids the necessity for stopping the harvester and dismounting from the tractor. For a more complete disclosure of devices of this type reference may be had to the Small Patent 1,160,777 which issued on November 16, 1915 on a corn husking and harvesting machine; another patent showing a similar construction is Thieman 2,004,711 which issued on June 11, 1935 on a corn picker.

Husking unit

Figure 3:
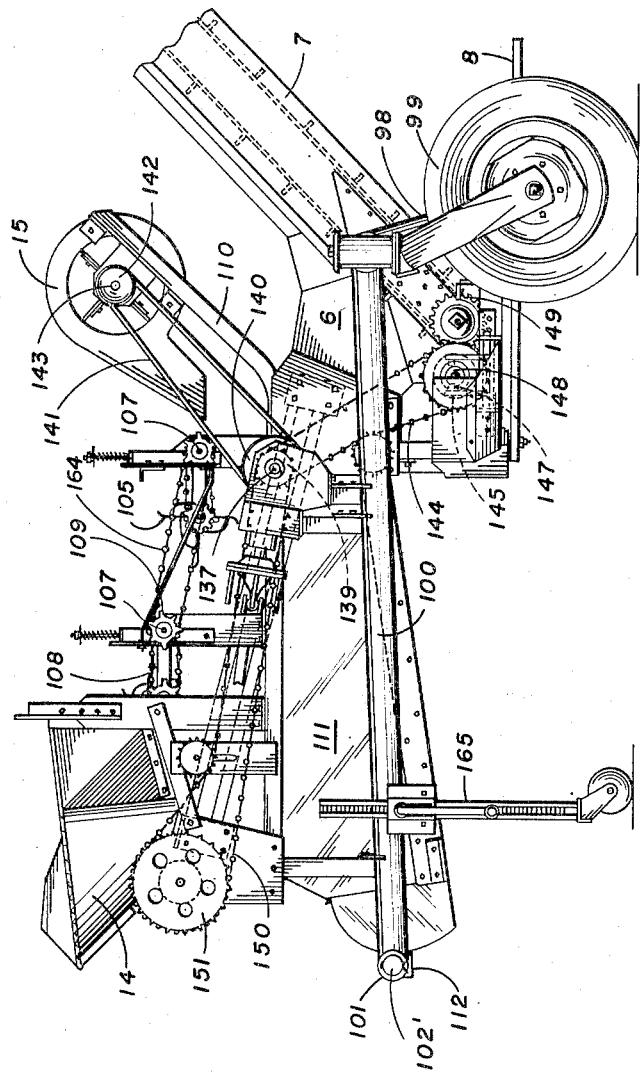
Fig. 3 is a side elevational view of the husking unit, only a portion of the elevator at the rear of the unit being shown.
Figure 4:
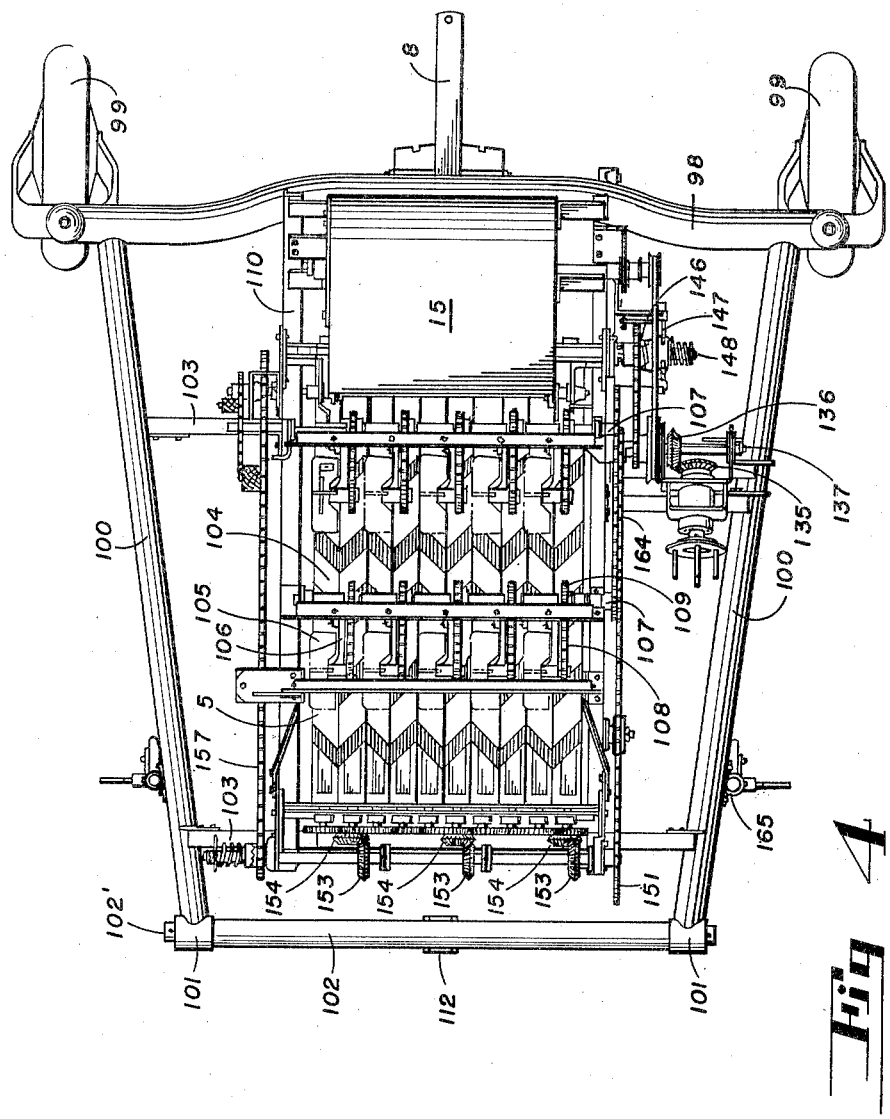
Fig. 4 is a top plan view of the husking unit with the rear elevator omitted. The sheet metal work for guiding the ears to the husking bed has also been omitted to simplify the illustration.

The husking unit, illustrated in Figs. 3 and 4, comprises a rigid tubular framework 98 to the rear of which are attached a pair of caster wheels 99. Side members 100 of the framework terminate at their front ends in rigidly attached tubular sleeves 101 which pivotally support a rigid transverse bar 102' which passes through and is pinned to a tubular supporting member 102. Member 102 is slidably received by guides 67, as will be described in greater detail later in this specification.

A transverse framework 103 is supported by side members 100. This framework supports husking bed 5 comprising a plurality of husking rolls 104 which extend longitudinally of the husking unit and are downwardly and rearwardly inclined.

As shown in Fig. 3, receiver 14 is secured to the front of the husking unit for receiving ears from the snapping units and directing them uniformly across the husking bed. During the husking operation, the ears slowly travel downwardly and rearwardly along the bed under the influence of gravity and the additional influence of a plurality of rotating paddles 105 which are positioned above the husking rolls. These paddles are individually suspended by cast arms 106 which are rotatably positioned on transverse shafts 107. Rotation is imparted to each of the paddles by associated drive chains 108 which are driven by sprockets 109 secured to and conjointly rotatable with shafts 107.

It is to be noted that ten husking rolls are included in the husking unit. This is a relatively large number and makes possible high husking efficiency. In many tractor mounted corn harvesters, the husking rolls are integral extensions of the snapping rolls and consequently the number of husking rolls that can be incorporated in the machine is limited. Further, in machines of that type the husking rolls are upwardly and rearwardly inclined and it is frequently difficult to husk the ears satisfactorily while keeping them moving towards the rear of the machine.

In contrast, the husking unit of the present invention is not structurally dependent upon the snapping rolls, and the number of husking rolls provided is limited primarily by weight and economic considerations. Ten husking rolls have been found by actual experiment to do an excellent job.

Inasmuch as the husking unit is centrally positioned adjacent the delivery ends of the first elevators, it is obvious that the ears from the snapping units can be accurately delivered and uniformly distributed over the entire husking bed. Improved husking efficiency is also attained through the relatively fixed positions of the snapping units and the husking unit attained through the semi-mounted attachment of the husking unit to the tractor, as will be described more fully shortly.

Returning to a detailed consideration of the husking unit per se, there is illustrated in Figs. 3 and 4 the centrifugal blower 15 which is rigidly supported by upwardly extending braces 110. The blower is belt-driven and directs a blast of air over the husking bed, thereby cleaning the bed as well as the ears and improving husking efficiency.

A corn saver 111 is secured beneath the husking unit in position to receive kernels dislodged from the ears during the husking operation.

Both the corn saver and husking bed deliver their kernels and ears, respectively, to hopper 6 positioned at the rear of the husking unit. This hopper (see Fig. 1) is located immediately adjacent the lower end of the second, or wagon, elevator 7. The elevator picks up the kernels and ears from hopper 6 and delivers them to a trailing vehicle, as has been explained.

Husking unit mounting

Many of the structural elements of the husking unit mounting have already been described. It will be helpful at this point to refer to Figs. 4 and 5 which illustrate the transverse supporting member 102 of the husking bed and the upwardly extending guides 67 of the tractor mounted bracket 58. With reference to Fig. 5, it will be noted that member 102 is slidably engaged in guides 67.

At the center of member 102 is provided a V-shaped knuckle 112 which bears against a saddle 113 secured to upright plates 114 secured in turn to the front and rear faces of channel 86 (see Figs. 6 and 8).

The engagement of knuckle 112 with saddle 113 is illustrated particularly well in Fig. 8. From this figure it will be noted that a latch pin 115 extends through holes 116 of plates 114 and holds the knuckle in loosely locked engagement with the saddle.

The knuckle transfers to the tractor mounted bracket 58 the weight of the front end of the husking unit. By virtue of pin 115, the husking unit cannot inadvertently become detached from the tractor. On the other hand, the formation of the saddle and knuckle permit limited rotation of the husking unit about its longitudinal axis. Such rotational movements are accommodated by guides 67 which nonetheless restrain the husking unit from lateral deviation and constrain it to follow directly behind the tractor. In addition, sleeves 101 permit rotation of member 102, allowing the husking unit to rotate about the transverse axis of member 102.

Obviously, when the tractor negotiates a turn, the caster wheels permit the rear end of the husking unit to swing along an arc behind the tractor, and the husking unit maintains its position relative to the snapping units. For this reason, it is not necessary to stop the operation of the snapping or husking units during the time that the turn is being negotiated since there is no possibility of loss of ears as they pass to the husking unit. On the other hand, it will be recognized that elevator 7 may swing away from a trailing vehicle during the time that the tractor is taking a turn. For this reason, a clutch is provided to temporarily stop the operation of the elevator 7, thereby precluding loss of ears. During the time that the elevator is inactive, ears from the husking bed can accumulate in the relatively large capacity hopper 6. More detailed information about the clutch mechanism appears in the following section.

Harvester drive elements

The driving elements for the harvester are illustrated schematically in Fig. 12. Certain of the elements have already been described with reference to the components of the snapping and husking units, but to promote a full understanding of the invention brief reference will be made to the over-all driving arrangement.

All of the power for driving the harvester is derived from the tractor power take-off shaft 19 which extends from the rear of the tractor, as indicated in Figs. 5 and 6. Attached to the power take-off shaft are a pair of sprockets 117 in driving engagement with laterally extending chains 118. These chains engage sprockets 119 and 119a of the snapping unit driving assemblies 68.

Sprocket 119 is secured to shaft 120 which drives universal joint 35 of the right-hand snapping unit which is illustrated in Figs. 9, 10, and 11. With particular reference to Fig. 12, it will be noted that the power is delivered by the universal joint to snapping roll shaft 34, power also being delivered through spur gear 32 to spur gear 32a attached to outer snapping roll shaft 33. It has been described with reference to this snapping unit, the long inner gathering chain 21 is driven through spur gear 31, bevel gears 28 and 29, and sprocket 26. The short upper and lower outer gathering chains 22 are driven through bevel gears 52 and 53, sprockets 48 and 50, chain 49, spur gears 46 and 47, and bevel gears 43 and 44.

The first elevator is driven by spur gear 47 by means of sprocket 55, as has been explained.

The left-hand snapping unit is substantially similar to the right-hand unit except for an inversion of parts in right-to-left order. As indicated in Fig. 12, sprockets 119a drives shaft 121, power from this shaft being transferred to the outer snapping roll by means of universal joint 122. It will be noted that similar rotation of each pair of snapping rolls is attained through delivery of power to that snapping roll of each pair which rotates in the same direction.

A pair of clearing rolls 123 is provided at the rear of each snapping unit. These clearing rolls remove loose stalks and other trash which may get into the first elevator. The clearing rolls perform a conventional function and not only remove loose stalks but also snap off any ears that may remain. The clearing rolls on the right side of the harvester are driven from shaft 124 which is the upper horizontal shaft to which is secured sprocket 125 at the upper end of the first elevator. Also secured to this shaft is another sprocket 126 in driving engagement with chain 127 which delivers power to sprocket 128 secured to one of the clearing rolls. Meshed gears 129 transfer power from the one to the other clearing roll.

As will be appreciated from the schematic Fig. 12, the driving mechanism for each set of clearing rolls is substantially the same.

In order to permit the clearing rolls to separate when a sizable amount of trash is encountered, the bearings of the upper clearing roll are spring-loaded, as indicated at 130 (also see Fig. 1).

Power is delivered to the husking unit through a shaft 131 including universal joints 132 and 133. Universal joint 132 is driven by shaft 121 to which sprocket 119a is secured.

Power from universal joint 133 is delivered to shaft 134 to which bevel gear 135 is secured in driving engagement with a second bevel gear 136. This bevel gear in turn is secured to a transverse shaft 137 to which sprockets 138 and 139, as well as V-belt pulley 140, are secured.

Pulley 140 engages belt 141 which is in driving engagement with another pulley 142 secured to shaft 143 of centrifugal blower 15.

Sprocket 139 drives chain 144 which transfers power through sprocket 145 to clutch element 146. This clutch element may be engaged by a cooperating element 147 which is slidably secured to shaft 148. When the clutch components are engaged, rotation is imparted to shaft 148 and hence to sprocket 149 which transfers power to the second or wagon elevator 7.

Sprocket 138 drives chain 150 which transfers power to sprocket 151 secured to transverse shaft 152 at the front of the husking unit. To this shaft is secured a plurality of bevel gears 153 (see Fig. 4), each bevel gear being in meshed engagement with another bevel gear 154 secured to certain individual husking rolls 104. It will be noted that a plurality of spur gears 155 transfer power from the husking rolls driven by bevel gears 154 to the adjacent husking rolls.

A sprocket 156 is also attached to shaft 152 for driving chain 157 located at the right-hand side of the husking unit. This chain drives sprocket 158 which is secured to shaft 159 by means of which power is delivered to sprockets 160 of the corn saver located beneath the husking unit.

Another sprocket 161 is also secured to shaft 159 and drives chain 162 which is in driving engagement with sprocket 163 attached to shaft 107 near the rear of the husking unit. It will be recalled that with reference to Figs. 3 and 4 the driving mechanism for paddles 105 was described. This driving mechanism included a plurality of sprockets 109 secured to shaft 107 in driving engagement with an associated plurality of chains 108, each chain being in driving engagement with an individual paddle unit 105.

Power is transferred from the rear to the front transverse shaft 107 by means of an interconnecting chain 164.

Through operation of clutch components 146 and 147, the second elevator 7 can be rendered inoperative during the time that the harvester makes a turn in a corn field. As has been explained, this avoids loss of ears as the rear end of elevator 7 moves away from the trailing vehicle while the harvester negotiates a turn.

*Assembly and disassembly of harvester*

From the foregoing description, it will be recognized that the harvester comprises three basic components, i. e., two snapping units and a husking unit. When the snapping units are detached from the tractor, they are supported on rigid stands which have not been illustrated since they do not comprise a part of this invention. When supported on the stands, the snapping units are joined through transverse structural member 80 and are positioned in space for ready attachment to the tractor, as has been described with reference to Fig. 7.

In attaching the snapping units to the tractor, the operator merely drives between the snapping units slowly engaging pins 70 with notches 75 of plates 76. The eyebolts 69 are then swung into engagement with anchor plates 77 and nuts 78 are tightened. The necessary connections are then made to the hydraulic unit 81 which, in combination with mounting bracket 58 and driving assemblies 68, can be left on the tractor. After making these few simple connections, the snapping units are ready for use.

If the harvester is going to be placed in use, the husking unit is secured to the rear of the tractor.

In attaching the husking unit to the tractor, hand jacks 165 (see Fig. 3) are used to raise the front of the husking unit until member 102 can be dropped into engagement with guide members 67 of the mounting bracket 58. After such engagement, the jacks are used to lower the front of the husking unit until knuckle 112 comes into bearing engagement against saddle 113. When the parts are thus positioned, pin 115 is then passed through plates 114 and the jacks 165 are raised out of ground engagement.

Shaft 131 with universal joints 132 and 133 is then attached so that power can be transferred from shaft 121 to the husking unit. When these connections have been made, the entire harvester is ready for use.

Should it become necessary to discontinue use of the harvester because the tractor is needed for other purposes, it is merely necessary to employ jacks 165 to lift the husking unit off of its mounting bracket and to disconnect shaft 131. The snapping units can be raised to an inoperative position by means of the hydraulic control mechanism shown in Fig. 6.

With the husking unit removed from the tractor, and the snapping units raised at its sides, the tractor can then be used for other purposes around the farm, such as for pulling other farm implements or wagons. The importance of this feature will be readily grasped by those skilled in the art since it makes it possible for a farmer with a single tractor to shift operations readily from harvesting to other farm activities without laboriously disconnecting a complicated harvester from the tractor. Instead, the snapping units can remain attached to the tractor and the husking unit can be readily attached and detached depending upon the need for the harvester.

An important feature of the invention is the provision of mounting plate 60, plates 61, and angle irons 62 between the tractor axle housing and each driving assembly 68 as illustrated in Fig. 7. These plates and angle irons can be readily and economically proportioned for particular tractor models without necessitating special designs of driving assemblies 68. Thus, adaptation of the harvester to different tractors merely involves substitution of a relatively simple, specially designed component. All other necessary changes can be readily effected through simple adjustments of the harvester components.

It will also be appreciated by those skilled in the art that the arrangement of parts facilitates use of the harvester in the form described as well as use as a corn sheller or snapper. Thus, the husking unit could be replaced with a sheller attachment which is structurally arranged in a fashion generally similar to the husking unit. Further, the husking unit could be replaced merely by a hopper which receives corn from the first elevators and directs it to a rearwardly extending elevator such as illustrated at 7. With such an arrangement, the implement could be used for corn snapping without performing the husking operation.

Other possible modifications will be apparent to those skilled in the art.

Having described a preferred embodiment of my invention, I claim:

1. In combination, a tractor mounted corn harvester designed to snap and husk ears of corn, a pair of snapping units, one snapping unit being attached at each side of the tractor in longitudinally extending relationship therewith, each snapping unit including a pair of forwardly positioned snapping rolls for removing the ears from the stalks and a first elevator for receiving ears from said snapping rolls and conveying them upwardly and rearwardly relative to the tractor; a removable husking unit in mounted disposition behind the tractor adjacent the upper ends of said first elevators, said husking unit including a pair of caster wheels at its rear end and a rigid transverse member at its front end, a rearwardly extending mounting bracket secured to the tractor and including upturned guide members for receiving said transverse member, a knuckle centrally secured to said transverse member, a saddle centrally positioned on said bracket between said guide members for receiving said knuckle, said transverse member slidably engaging said guide members with said knuckle resting on said saddle whereby said husking bed is constrained to follow directly behind the tractor, said guide members permitting limited rotational movements of said husking bed about its longitudinal axis, a plurality of longitudinal downwardly and rearwardly extending husking rolls in said husking unit positioned to receive ears from said first elevators, and a second elevator secured to said husking unit at the rear of said husking rolls to receive husked ears therefrom.

2. In combination in a tractor mounted corn harvester designed to snap ears of corn from their stalks and to remove the husks therefrom, a pair of snapping units, one snapping unit being located at each side of the tractor in longitudinally extending relationship therewith, each snapping unit including a pair of forwardly positioned snapping rolls for removing the ears from the stalks and a first elevator for receiving ears from said snapping rolls and conveying them upwardly and rearwardly relative to the tractor; a husking unit removably secured to the rear of the tractor, caster supporting wheels at the rear of said husking unit, transverse rigid supporting means secured to the front of said husking unit; a supporting bracket including upwardly disposed guides for slidably receiving said supporting means of said husking unit, said bracket being rigidly attached to and extending rearwardly from the tractor whereby said husking unit is constrained to follow directly behind the tractor; a plurality of longitudinally, downwardly, and rearwardly extending husking rolls on said husking unit positioned to receive ears from said first elevators and to remove the husks from the ears; and a second elevator secured to said husking bed at the rear of said husking rolls to receive husked ears therefrom.

3. In combination in a tractor mounted corn harvester designed to snap and husk ears of corn, a pair of snapping units, one snapping unit being located at each side of the tractor in longitudinally extending relationship therewith, each snapping unit including a pair of forwardly positioned snapping rolls and a first elevator for receiving ears from said snapping rolls and conveying them upwardly and rearwardly relative to the tractor; a husking unit, caster type ground supporting means at the rear of said husking unit, rigid supporting means secured to the front of said husking unit, a mounting bracket including guides for slidably receiving said supporting means of said husking unit, said bracket being rigidly attached to the rear of the tractor whereby said husking unit is constrained to follow directly behind the tractor; and husking rolls on said husking unit positioned to receive ears from said first elevators.

4. In combination in a corn harvester for attachment to a tractor, a pair of snapping units, one snapping unit being located at each side of the tractor in longitudinally extending relationship therewith, each snapping unit including snapping rolls and a first elevator extending upwardly and rearwardly from said snapping rolls, a husking unit mounted behind the tractor adjacent the rear ends of said first elevators, said husking unit including caster wheels at its rear end and a rigid transverse member at its front end, a rearwardly extending mounting bracket secured to the tractor and including upturned guides for receiving said transverse member, a knuckle centrally secured to said transverse member, a saddle centrally positioned on said bracket between said guides for receiving said knuckle, said transverse member slidably engaging said guides with said saddle pivotally supporting said knuckle whereby said husking unit is constrained to follow directly behind the tractor, said guides and knuckle permitting limited rotational movements of said housing unit about its longitudinal axis.

5. In combination in a corn harvester for attachment to a tractor, a husking unit in mounted disposition behind the tractor, said husking unit including swivelled ground support wheels at its rear end and rigid supporting means at its front end, a bracket secured to the rear of the tractor and including guides for receiving said husking unit supporting means, means releasably interconnecting said supporting means and said bracket, said guides constraining said husking unit to follow directly behind the tractor while permitting limited rotational movements of said husking unit about its longitudinal axis.

6. In combination in a corn harvester for attachment to a tractor, a husking unit mounted behind the tractor, said husking unit including swivelled ground supporting means near its rear end and transverse supporting means at its front end, a rearwardly extending bracket on the tractor including guides for slidably receiving said transverse supporting means of said husking unit, and centrally disposed means for releasably interconnecting said husking unit to said bracket whereby said guides are interconnecting means constrain said husking bed to follow directly behind said tractor while permitting limited rotational movements of said husking unit about its longitudinal axis.

7. In combination in a corn harvester for attachment to a tractor having a rear axle housing, a pair of snapping units, one snapping unit being secured to the tractor axle housing at each side of the tractor, a husking unit mounted behind the tractor adjacent the rear ends of said snapping units, said husking unit including ground supporting means at its rear end and aligned horizontally extending cyindrical sleeves at its forward end, a rigid transverse member rotatably engaging said sleeves, a rearwardly extending bracket secured to the tractor axle housing, said bracket including guides for slidably receiving said rigid transverse member, and centrally disposed means for releasably interconnecting said transverse member and said bracket whereby said guides and interconnecting means constrain said husking unit to follow directly behind said tractor while permitted limited rotational movements of said husking unit about its longitudinal axis, the engagement of said transverse member with said sleeves also permitting relative rotation of said husking unit and tractor about the common axis of said sleeves.

8. In combination in a corn harvester for attachment to a tractor having a rear axle housing, a husking unit mounted behind the tractor, said husking unit including ground supporting wheels and having rigid transverse supporting means near its front end, a rearwardly extending bracket secured to the tractor axle housing, vertical guides on said bracket for slidably receiving said rigid transverse supporting means of said husking unit and confining it for vertically sliding movement, and means on said bracket for maintaining said transverse supporting means and said guides in slidable engagement.

9. In combination in a corn harvester for attachment to a tractor having a rear axle housing, a pair of snapping units, a husking unit, a bracket attached to the rear axle housing at each side of the tractor, a driving assembly secured to said bracket at each side of the tractor, one of said snapping units being adjustably attached to a driving assembly at each side of the tractor, said snapping units extending longitudinally of the tractor and being vertically adjustable relative to the tractor, the rear ends of said snapping units being above and adjacent said bracket, vertical guides on said bracket, a rigid transverse member secured to the front of said husking unit slidably engaged with said guides, said husking unit being constrained thereby to follow in trailing relationship directly behind the tractor in position to receive corn from the rear ends of said snapping units at all times, and caster wheels supporting said husking unit remote from said rigid transverse member.

10. In combination in a corn harvester for attachment to a tractor having a rear axle housing, a pair of snapping units, a husking unit, a bracket attached to the rear axle housing at each side of the tractor extending rearwardly therefrom, a driving assembly attached to said bracket at each side of the tractor, a snapping unit being removably attached to each driving assembly and extending longitudinally of the tractor, transverse supporting means secured to the front of said husking unit, said bracket including vertically disposed guides slidably engaged by said transverse supporting means constraining said husking unit to follow directly behind the tractor at all times but permitting movement of said husking unit about its longitudinal axis, means transferring power from the tractor to each driving assembly, each driving assembly transferring power to a snapping unit, means interconnecting one of said driving assemblies and said husking unit for delivering power from the tractor to said husking unit, and caster type ground engaging means supporting a part of the weight of said husking unit.

11. In combination in a corn harvester for attachment to a tractor having a rear axle housing, a husking unit, a bracket attached to the rear axle housing at each side of the tractor and extending rearwardly therefrom, a transverse supporting member rotatably engaged with the front of said husking unit, upwardly extending guides on said bracket slidably receiving said transverse supporting member, and means on said transverse supporting member in pivotal engagement with said bracket, said husking unit being constrained to follow directly behind said tractor at all times and being free to execute rotational movement about its longitudinal axis and about the transverse axis of said transverse supporting member.

References Cited in the file of this patent
UNITED STATES PATENTS

| | | |
|---|---|---|
| 1,504,516 | Schmechel et al. | Aug. 12, 1924 |
| 1,945,119 | Metcalf | Jan. 30, 1934 |
| 1,972,407 | Morse | Sept. 4, 1934 |
| 2,477,980 | Hardy et al. | Aug. 2, 1949 |
| 2,507,711 | Hardy et al. | May 16, 1950 |
| 2,592,866 | Coultas et al. | Apr. 15, 1952 |